United States Patent
Parker

(10) Patent No.: US 10,558,486 B2
(45) Date of Patent: Feb. 11, 2020

(54) MEMORY ADDRESS TRANSLATION MANAGEMENT

(71) Applicant: ARM LIMITED, Cambridge, Cambridgeshire (GB)

(72) Inventor: Jason Parker, Sheffield (GB)

(73) Assignee: ARM Limited, Cambridge (GB)

( * ) Notice: Subject to any disclaimer, the term of this patent is extended or adjusted under 35 U.S.C. 154(b) by 45 days.

(21) Appl. No.: 16/066,382

(22) PCT Filed: Dec. 21, 2016

(86) PCT No.: PCT/GB2016/054009
§ 371 (c)(1),
(2) Date: Jun. 27, 2018

(87) PCT Pub. No.: WO2017/129932
PCT Pub. Date: Aug. 3, 2017

(65) Prior Publication Data
US 2019/0155634 A1    May 23, 2019

(30) Foreign Application Priority Data
Jan. 26, 2016  (GB) .................................. 1601423.5

(51) Int. Cl.
*G06F 12/00*  (2006.01)
*G06F 9/455*  (2018.01)
(Continued)

(52) U.S. Cl.
CPC ........ *G06F 9/45558* (2013.01); *G06F 11/073* (2013.01); *G06F 12/1009* (2013.01); *G06F 12/1027* (2013.01); *G06F 2009/45583* (2013.01)

(58) Field of Classification Search
CPC ............. G06F 9/45558; G06F 12/1009; G06F 11/073; G06F 12/1027; G06F 2009/45583
See application file for complete search history.

(56) References Cited

U.S. PATENT DOCUMENTS

2004/0177261 A1* 9/2004 Watt .................... G06F 12/1491
 713/193
2011/0179214 A1 7/2011 Goggin et al.
(Continued)

FOREIGN PATENT DOCUMENTS

GB    2 517 493    2/2015

OTHER PUBLICATIONS

International Search Report and Written Opinion of the ISA for PCT/GB2016/054009, dated Mar. 22, 2017, 12 pages.
(Continued)

*Primary Examiner* — Mark A Giardino, Jr.
(74) *Attorney, Agent, or Firm* — Nixon & Vanderhye P.C.

(57) ABSTRACT

A data processing apparatus (2) includes memory management circuitry (18) for managing a two-stage address translation from a virtual address VA to an intermediate physical address IPA and then from the intermediate physical address IPA to a physical address PA. The first stage of the translation is performed using first stage translation data (22) controlled by a virtual machine program executing within a virtual machine execution environment provided by a hypervisor program which manages second stage translation data (24) for performing a second stage translation. If a region of memory is designated as a virtual machine private region accessible to a given virtual machine, but inaccessible to the hypervisor program, and also as a device region, then the memory management circuitry (18) performs private-device region management in respect of that region (i.e. the intermediate physical address may not be altered by the second stage translation). If a region is not both a virtual machine private region and a device region, then the memory management circuitry (18) performs non-private device management thereon.

21 Claims, 4 Drawing Sheets

Figure 1:
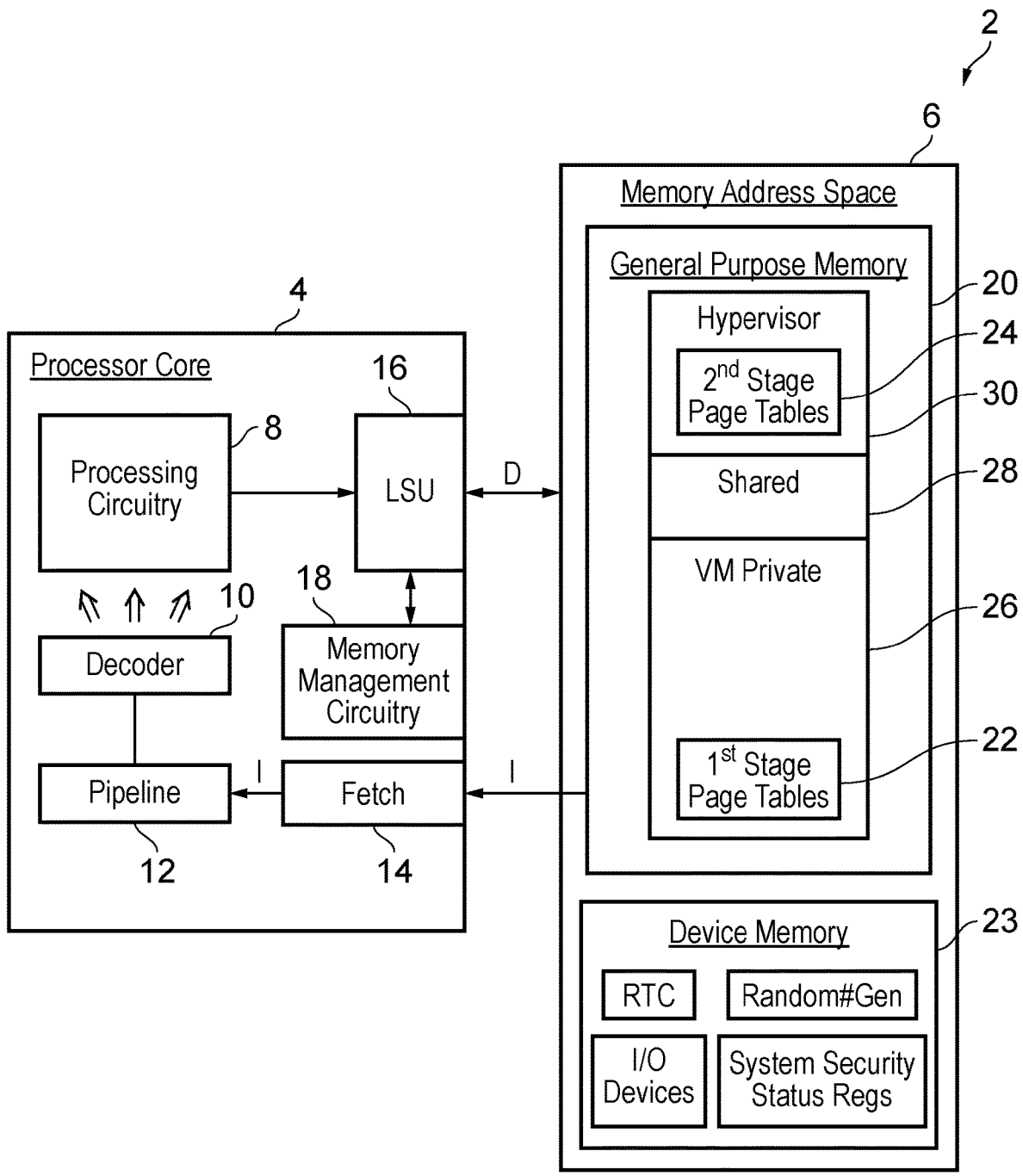

(51) Int. Cl.
  *G06F 12/1009* (2016.01)
  *G06F 11/07* (2006.01)
  *G06F 12/1027* (2016.01)
  *G06F 13/00* (2006.01)
  *G06F 13/28* (2006.01)

(56) References Cited

U.S. PATENT DOCUMENTS

| | | | |
|---|---|---|---|
| 2014/0282501 A1* | 9/2014 | Zeng | G06F 9/45545 |
| | | | 718/1 |
| 2014/0282508 A1 | 9/2014 | Plondke et al. | |
| 2016/0132345 A1* | 5/2016 | Bacher | G06F 9/45558 |
| | | | 718/1 |
| 2018/0173641 A1* | 6/2018 | Parker | G06F 12/1009 |
| 2018/0307435 A1* | 10/2018 | van Riel | G06F 9/45558 |
| 2019/0146693 A1* | 5/2019 | Severino | G06F 3/0622 |
| 2019/0266000 A1* | 8/2019 | Tsirkin | G06F 12/1009 |

OTHER PUBLICATIONS

Combined Search and Examination Report for GB1601423.5, dated Jul. 15, 2016, 7 pages.
Examination Report for GB Application No. 1601423.5 dated Apr. 16, 2019, 3 pages.

* cited by examiner

MEMORY ADDRESS TRANSLATION MANAGEMENT

This application is the U.S. national phase of International Application No. PCT/GB2016/054009 filed 21 Dec. 2016, which designated the U.S. and claims priority to GB Patent Application No. 1601423.5 filed 26 Jan. 2016, the entire contents of each of which are hereby incorporated by reference.

This disclosure relates to the field of data processing systems. More particularly, this disclosure relates to the management of translation of virtual addresses to physical addresses within a data processing system.

It is known to provide data processing systems which provide a virtual machine execution environment managed by a hypervisor program and which translate virtual addresses generated by a virtual machine program to a physical address of a memory.

At least some embodiments of the disclosure provide apparatus for processing data comprising:

processing circuitry to execute a hypervisor program to provide a virtual machine execution environment and to execute a virtual machine program using said virtual machine execution environment; and memory management circuitry to manage a translation of a virtual address generated by said virtual machine program to a physical address of a memory using first stage translation data specifying a translation from said virtual address to an intermediate physical address and second stage translation data specifying a translation from said intermediate physical address to said physical address; wherein said memory management circuitry controls access to said memory to provide one or more virtual-machine private regions within said memory that are accessible to said virtual machine program and are at least marked as inaccessible to said hypervisor program;

said first stage translation data includes attribute data to mark respective regions of said memory as one of one or more device regions or as one of one or more non-device regions; and when a memory access request by said virtual machine program is to a target region of said memory that is both a virtual machine private region and a device region, said memory management circuitry modifies management of said translation performed in dependence upon said second stage translation data to provide private-device region management.

At least some embodiments of the disclosure provide apparatus for processing data comprising:

processing means for executing a hypervisor program to provide a virtual machine execution environment and for executing a virtual machine program using said virtual machine execution environment; and memory management means for managing a translation of a virtual address generated by said virtual machine program to a physical address of a memory using first stage translation data specifying a translation from said virtual address to an intermediate physical address and second stage translation data specifying a translation from said intermediate physical address to said physical address; wherein said memory management means controls access to said memory to provide one or more virtual-machine private regions within said memory that are accessible to said virtual machine program and are at least marked as inaccessible to said hypervisor program;

said first stage translation data includes attribute data to mark respective regions of said memory as one of one or more device regions or as one of one or more non-device regions; and when a memory access request by said virtual machine program is to a target region of said memory that is both a virtual machine private region and a device region, said memory management means modifies management of said translation performed in dependence upon said second stage translation data to provide private-device region management.

At least some embodiments of the disclosure provide a method of processing data comprising:

executing a hypervisor program to provide a virtual machine execution environment;

executing a virtual machine program using said virtual machine execution environment;

managing a translation of a virtual address generated by said virtual machine program to a physical address of a memory using first stage translation data specifying a translation from said virtual address to an intermediate physical address and second stage translation data specifying a translation from said intermediate physical address to said physical address; and controlling access to said memory to provide one or more virtual-machine private regions within said memory that are accessible to said virtual machine program and are at least marked as inaccessible to said hypervisor program; wherein said first stage translation data includes attribute data to mark respective regions of said memory as one of one or more device regions or as one of one or more non-device regions; and when a memory access request by said virtual machine program is to a target region of said memory that is both a virtual machine private region and a device region, modifying management of said translation performed in dependence upon said second stage translation data to provide private-device region management.

Figure 2:
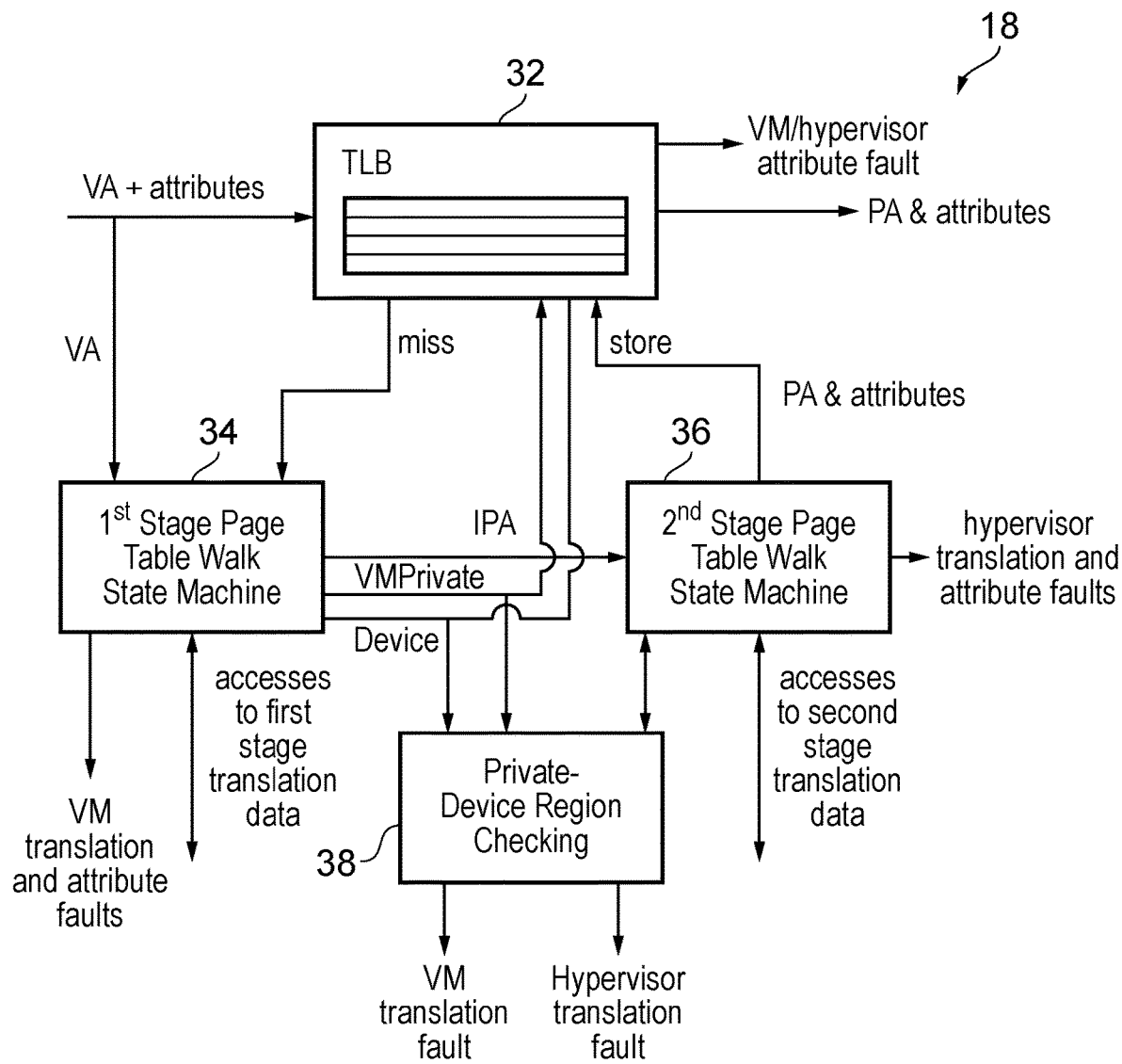
Figure 3:
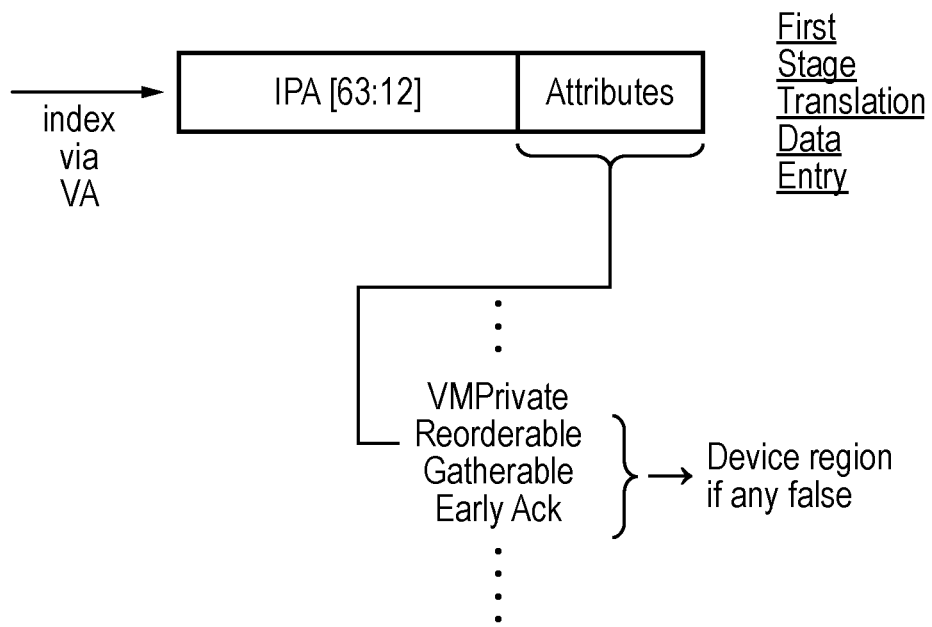
Figure 4:
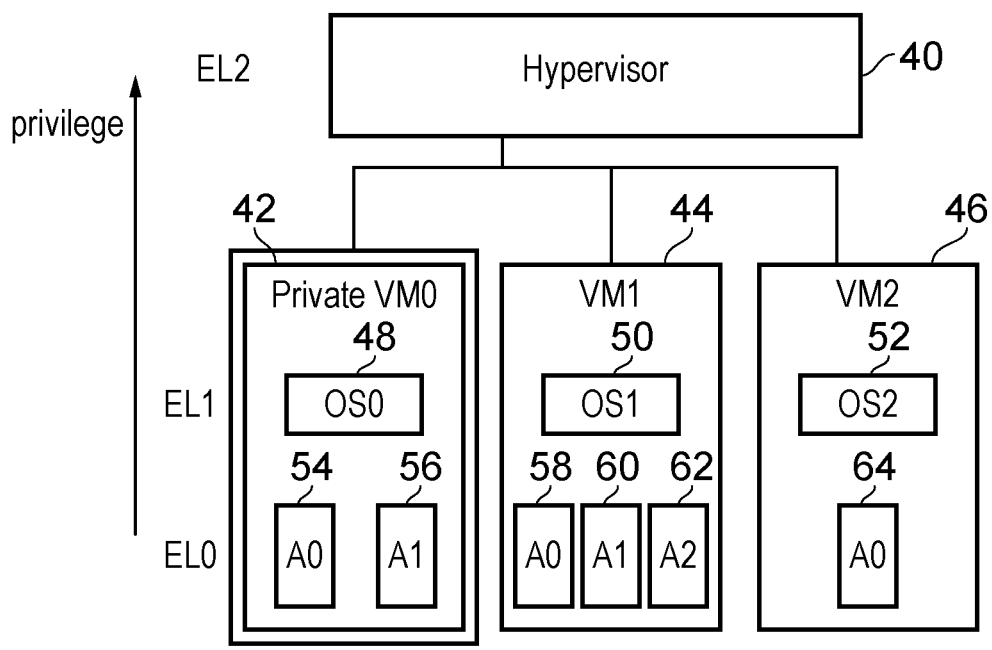
Figure 5:
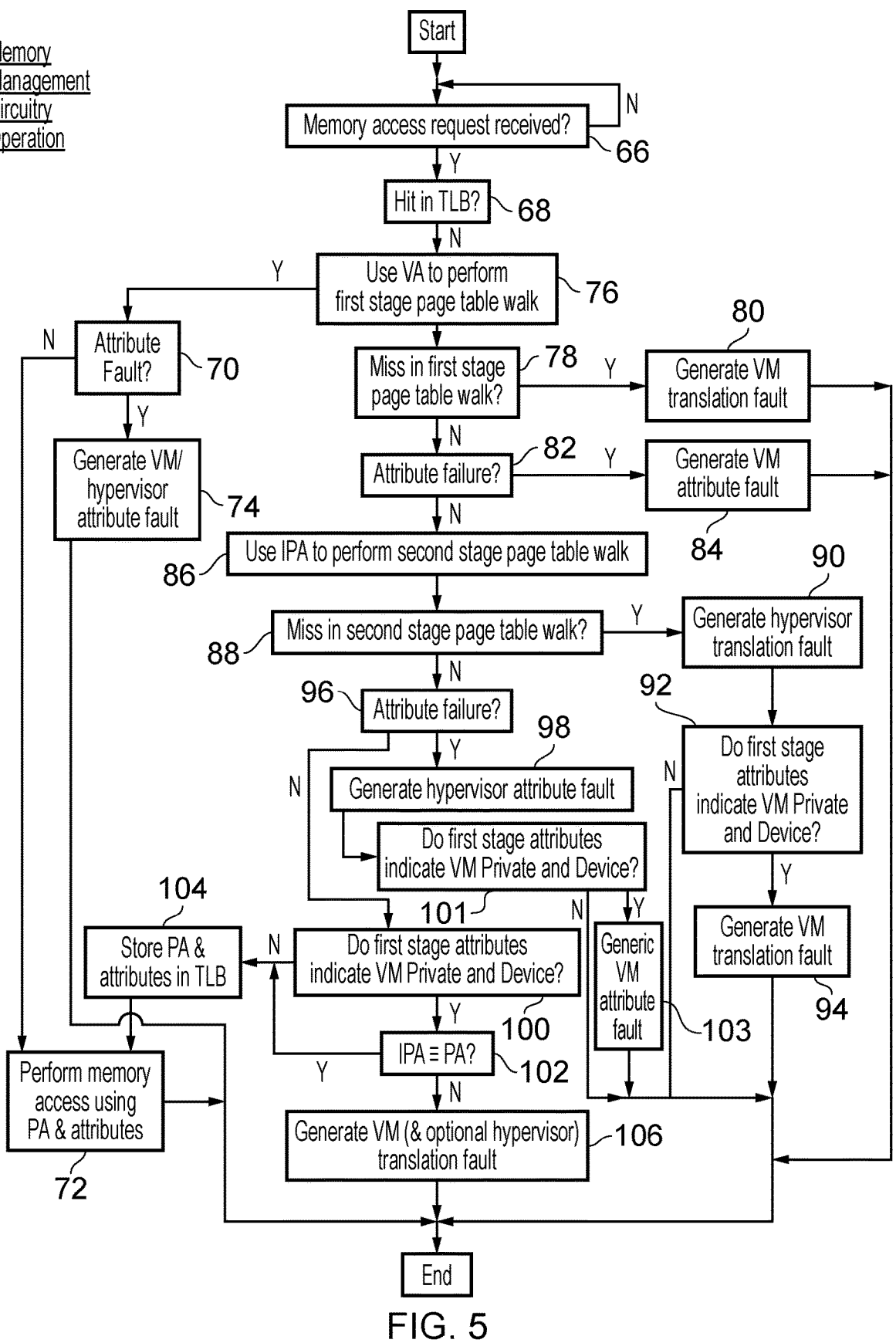

Example embodiments will now be described, by way of example only, with reference to the accompanying drawings in which:

FIG. 1 schematically illustrates a data processing system supporting execution of a hypervisor program providing a virtual machine execution environment to a virtual machine program;

FIG. 2 schematically illustrates memory management circuitry to manage translation of a virtual address to a physical address using first stage translation data and a second stage translation data;

FIG. 3 schematically illustrates a first stage translation data entry;

FIG. 4 schematically illustrates a hypervisor program providing respective virtual machine execution environments to a plurality of programs executing within those virtual machine execution environments; and FIG. 5 is a flow diagram schematically illustrating the operation of the memory management circuitry of FIG. 2.

FIG. 1 schematically illustrates a data processing system 2 including a processor core 4 and a memory 6. The processor core 4 includes processing circuitry 8 for executing program instructions as decoded by a decoder 10 from an instruction pipeline 12 into which the program instructions are fetched by a fetch unit 14. The processing circuitry 8 executes a hypervisor program to provide one or more virtual machine execution environments each for executing respective program(s) with those virtual machine execution environments (hereafter a virtual machine program). A load/ store unit 16 performs memory access operations to the memory 6 as specified by program instructions executed by the processing circuitry 8. Memory management circuitry 18 serves to perform memory management operations in respect of the memory access operations performed by the load/store unit 16. The memory management operations performed by the memory management circuitry 18 include managing the translation between a virtual address (VA) generated by a virtual machine program and a physical address (PA) used to address a storage location within the memory 6. The memory management circuitry 18 may also manage access using attributes defining features such as whether or not a particular region (page) of the memory address space within the memory 6 is read only, write only, read/write, cacheable, bufferable, etc.

The memory 6 provides a memory address space which includes a general purpose memory region 30 and a device memory region 3. The general purpose memory region 20 is typically used for storing programs and data, such as a hypervisor program, a virtual machine program (e.g. an operating system and application programs running in a virtual machine execution environment provided by the hypervisor program), data for manipulation, and memory management data, such as first stage translation data 22 and second stage translation data 24. In the embodiment of FIG. 1, different portions of the general purpose memory region 20 are provided as either virtual machine private regions 26, shared regions 28 or hypervisor regions 30. The device memory region 23 includes memory addresses dedicated to memory mapped hardware devices, such as a real time clock device, a random number generator, system security status registers and various memory mapped input/output devices (e.g. a UART).

The memory management circuitry 18 uses the first stage translation data 22 and the second stage translation data 24 to manage access to various regions within the memory address space of the memory 6 such that a hypervisor region 30 is accessible to a hypervisor program, but is not normally accessible to programs with a lower level of privilege (lower exception level state). A virtual machine private region 26 is managed by the memory management circuitry 18 using the first stage translation data 22 and the second stage translation data 24 to be accessible to a corresponding virtual machine program, but to be inaccessible to the hypervisor program, even though the hypervisor program has a higher level of privilege, (a higher exception level and would normally be expected to have access permission rights over memory regions used by programs of lower levels of privilege). A shared region 28 is managed by the memory management circuitry 18 using the first stage translation data 22 and the second stage translation data 24 to be accessible to both the hypervisor program and the virtual machine program.

The device memory region 23 provides for memory mapped hardware devices. Access to at least some of the device memory region 23 is controlled by the first stage translation data 22 and the second stage translation data 24 to be a virtual machine private region. Accordingly, a given memory mapped device within the memory address space of the memory 6 may correspond to an address within that memory address space which is both a device memory region and a virtual machine private region. A memory mapped device within a virtual machine private region has memory access thereto managed by the memory management circuitry 18 under control of the first stage translation data and the second stage translation data 24 such that access is provided to a corresponding virtual machine program, but is not provided to other programs, such as the hypervisor program.

In order to facilitate support of the virtualization provided by the hypervisor program, the memory management circuitry 18 is responsive to the first stage translation data 22 to translate a virtual address (VA) generated by a virtual machine program into an intermediate physical address IPA which corresponds to the virtual machine programs' view (at least at the operating system level) as to what should be the physical address of the virtual address it has generated.

The memory management circuitry 18 uses second stage translation data 24 to perform a second stage translation of the intermediate physical address IPA to a physical address PA to be applied to the memory 6 by the load/store unit 16. In this way, the hypervisor program is able to remap intermediate physical addresses IPA as generated by a virtual machine program into physical addresses PA to be applied to the memory 6 and that can differ from the intermediate physical addresses IPAs. The second stage translation data 24 is stored within a hypervisor memory region 30 which is accessible to a hypervisor program but is not accessible to a virtual machine program. The first stage translation data 22 is stored within a virtual machine private region 26 which is accessible to the virtual machine program but is not accessible to the hypervisor program.

While it may be desirable, and facilitates improved operation, if the second stage translation data 24 is permitted to translate an intermediate physical address IPA into a different physical address PA for general purpose memory 20, this may not be true in respect of device memory 23. In particular, in the context of a system in which the virtual machine private region 26 is accessible to a virtual machine program, but is inaccessible to a hypervisor program, it may be undesirable to permit the second stage translation data 24 (under control of the hypervisor program) to change an intermediate physical address IPA as generated by the virtual machine program into a different physical address PA which may not correspond to the memory mapped hardware device intended by the virtual machine program. In order to help manage the proper translation of virtual addresses VA generated by a virtual machine program to addresses corresponding to a virtual machine private region and a device region within the memory address space, the memory management circuitry 18 may serve to identify such accesses and subject them to private-device region management, which is different from non-private-device region management (applied when a target region of a memory containing a target address is other than both a virtual-machine private region and a device region).

The private-device region management may take a variety of different forms, and may include determining whether the second stage translation data serves to translate the intermediate physical address IPA of a memory access to be made to a physical address IPA that does not match (either directly or indirectly) the intermediate physical address IPA. One form of matching which may be enforced by the private-device region management used by the memory management circuitry 18 in respect of a target region which is both a virtual machine private region and a device region is that the intermediate physical address IPA should be identical to the physical address PA, i.e. that the second stage translation data 24 does not translate the intermediate physical address into a different form.

If the memory management circuitry 18 when applying the private-device region management identifies that a physical address PA generated is unmatched with the intermediate physical address IPA, then the memory management unit returns a fault indication, such as a translation fault indication, to the virtual machine program. Thus, the virtual machine program may be alerted to an inappropriate attempt to redirect its mapping between virtual addresses VA and intermediate physical addresses IPA of memory mapped devices. The virtual machine program could respond to such an inappropriate mapping attempt by, for example, shutting down its execution such that its security is not compromised.

In some embodiments, the memory management circuitry 18 may also serve to return a fault indication (such as a translation fault) to the hypervisor program when it detects that the intermediate physical address IPA is unmatched to the physical address PA for an address translation that lies both within a virtual machine private region and a device region (i.e. is subject to private-device region management by the memory management circuitry 18).

Another problem which may arise during address management in accordance with the private-device region management is the absence of translation data within the second stage translation data to translate the intermediate physical address IPA to a physical address PA (i.e. no data is present providing a one-to-one mapping of intermediate physical address IPA to physical address PA in respect of a memory region which is both a virtual machine private region and a device region). In this case, the private-device region management may serve to send a fault, such as a translation fault, to both the hypervisor program and the virtual machine program. The hypervisor program may respond to the fault by providing appropriate second stage translation data 24 that will return a one-to-one mapping if the translation is reattempted by the virtual machine program (which may be set up to retry, at least once, a translation which resulted in a translation fault being returned to the virtual machine program).

As discussed above, the private-device region management enforced by the memory management circuitry 18 serves to prevent any remapping of an intermediate physical address IPA generated by a virtual machine program by virtue of the first stage of address translation into a different physical address PA. By contrast, non-private device management provided by the memory management circuitry 18 in respect of a memory region which is other than both a virtual-machine private region and a device region, permits the second stage translation data 24 to translate the intermediate physical address IPA to a physical address PA different from the intermediate physical address IPA. If the second stage translation data 24 does not contain an entry to map an intermediate physical address IPA to a physical address PA when the memory management circuitry 18 is applying non-private device management, then the memory management circuitry 18 may return a translation fault to the hypervisor program without sending a fault indication to the virtual machine program in order to enable the hypervisor program to attempt to rectify the absence of the intermediate physical address IPA to physical address PA translation within the second stage translation data 24, such as by remapping the device to provide stage two translation data or to trap and emulate the device with its own software and provide the results back to the virtual machine.

The first stage translation data 22 stored within the virtual machine private region 26 permits a region to be marked as a virtual machine private region. As the first stage translation data 22 is stored within the virtual machine private region 26, it can be accessed by the virtual machine program (and not by other programs) and thus if a virtual machine program marks a region as a virtual machine private region, then another program may not mark that region differently and so override the private nature enforced by the virtual machine program. If the data processing system 2 is executing a hypervisor program supporting multiple virtual machine execution environments, then each of these virtual machine programs may have one or more respective virtual-machine private regions which are inaccessible to both the hypervisor program and any different other virtual machine program which is executing, i.e. a virtual machine private region is private to an individual virtual machine execution environment and is not shared with other virtual machine execution environments or the hypervisor program.

FIG. 2 schematically illustrates a portion of the memory management circuitry 18 in more detail. In particular, the memory management circuitry 18 includes a translation lookaside buffer 32, a first stage page table walk state machine 34, a second stage page table walk state machine 36 and private-device region checking circuitry 38. A virtual address VA is input together with attributes associated with the memory access to be performed, and the current state of the data processing system 2, to the translation lookaside buffer 32 where it is determined whether or not the translation lookaside buffer 32 is already storing (caching) appropriate translation data to translate that virtual address VA into a physical address PA and associated attributes. The translation data stored within the translation lookaside buffer 32 represents a previous translation for a region concerned that has been made by reference to the first stage translation data 22 and the second stage translation data 24. The first stage translation data 22 serves to translate the virtual address VA into the intermediate physical address IPA. The second stage translation data 24 serves to translate the intermediate physical address IPA into a physical address PA. When the same region of memory is subsequently accessed, and the translation data is still held within the translation lookaside buffer 32, then the translation lookaside buffer 32 translates directly from the virtual address VA to the physical address PA. The physical address PA generated by the translation lookaside buffer 32 may also be accompanied by attributes to be associated with that memory access using the physical address PA, i.e. attributes such as the corresponding data being un-cacheable, not re-orderable, not gatherable, (i.e. not to be consolidated with neighboring accesses), not subject to early acknowledgement, etc.

When a virtual address VA applied to the translation lookaside buffer 32 produces a miss, then the first stage page table walk state machine 34 serves to perform a page table walk through the first stage translation data 22 to return translation data to translate the virtual address VA into an intermediate physical address IPA. The first stage translation data entry for the virtual address which is recovered also includes attributes which indicate whether or not the region containing that virtual address is a virtual machine private region and whether the region containing that virtual address is a device region. If the first stage page table walk performed by the first stage page table walk state machine 34 does not find a translation within the first stage translation data 22, or the translation data found indicates that the attributes correspond to a permission fault, then the first stage page table walk state machine 34 generates an appropriate one of a virtual machine translation fault or a virtual machine attribute fault, that is returned to the virtual machine program.

The intermediate physical address IPA is passed from the first stage page table walk state machine 34 to the second stage page table walk state machine 36, which then performs a page table walk through the second stage translation data 24 to generate a physical address PA which is returned and stored within the translation lookaside buffer 32 for use if the same region (page of the memory address space within the memory 6) is accessed again before that translation data 32 stored (cached) within the translation lookaside buffer 32 is evicted therefrom. If the second stage translation data 24 does not containing an appropriate translation, or the attributes associated with the memory access indicate a permission fault, then the second stage page table walk state machine 36 generates a hypervisor translation fault or an attribute translation fault, which is returned to the hypervisor program.

When the first stage page table walk state machine 34 indicates that a region within the memory address space is both a virtual machine private region and a device region, then this triggers the private-device region checking circuitry 38 to additionally perform checks corresponding to private-device region management by the memory management circuitry 18. When the region accessed by the first stage page table walk state machine 34 is other than both a virtual machine private region and a device region, then the private-device region checking circuitry 38 does not perform these additional checks and such operation corresponds to non-private-device region management by the memory management circuitry 18. The additional check performed by the private-device region checking circuitry 38 is that the intermediate physical address IPA generated by the first stage page table walk state machine 34 is unaltered by the second stage page table walk state machine 36 and forms the physical address PA. This check may be performed within the second stage page table walk state machine 36, under control of the private-device region checking circuitry 38, rather than requiring the physical address PA and the intermediate physical address IPA to be provided to the private-device region checking circuitry 38 itself. For example, the physical address PA returned by the second stage page table walk may be compared on a bit-by-bit basis with the intermediate physical address IPA by the second state page table walk state machine 36 when performing private-device region management to ensure a one-to-one match. If there is not a one-to-one match, then the second stage page table walk state machine 36 returns a signal indicating this to the private-device region checking circuitry 38, which then generates a virtual machine translation fault, and optionally also a hypervisor translation fault. If there is a one-to-one match between the intermediate physical address IPA and the physical address PA in respect of a region of memory which is both a virtual machine private region and a device region, then the access is allowed to proceed without faults and an appropriate entry is stored within the translation lookaside buffer 32. In this way, the additional checking performed by the private-device region checking circuitry 38 is only needed when a new entry is being stored within the translation lookaside buffer 32, thereby reducing the overhead associated with this additional check and removing this additional check from what is normally the critical path for memory accesses through the translation lookaside buffer 32.

FIG. 3 schematically illustrates an entry within the first stage translation data. In particular, this entry (which may be formed by data assembled from multiple lookups performed during the page table walking process) provides a translation between a virtual address VA and an intermediate physical address at least at the level of a region (page) granularity, e.g. 4 kB pages corresponding to address bits [63: 12]. The first stage translation data entry also includes attribute data associated with that region (page) indicating, for example, that the region concerned has been designated by the virtual machine program as a virtual machine private region, a region that is re-orderable, a region that is gatherable, a region that is subject to early access completion acknowledgement, etc. A region may not be explicitly marked as a device region, but rather this may be inferred by a region being marked to indicate that it is any one or more of not subject to reordering, gathering or early acknowledgement. In order embodiments it would be possible for a region to be explicitly marked as a device region. The device regions are typically used for memory mapped hardware devices, such as, for example, a real time clock, a random number generator, memory mapped input/output devices and/or system security status registers.

FIG. 4 schematically illustrates a hierarchy of programs which may be executed by the data processing system 2. This hierarchy includes a hypervisor program 40 providing multiple virtual machine execution environments 42, 44, 46. The virtual machine execution environment 42 is a private virtual machine execution environment within which at least some of the memory regions within the memory address space which it uses is marked as virtual machine private regions (i.e. accessible with that virtual machine execution environment 42, but not accessible to either the hypervisor 40 or any of the other virtual machine execution environments 44, 46. Also illustrated in FIG. 4 are the respective exception levels (privilege levels) associated with the different programs that are executed. The hypervisor program 40 executes at the highest exception level EL2 (highest privilege level). Operating system program 48, 50, 52 and one or more application programs 54, 56, 58, 60, 62, 64 comprise the virtual machine programs. The operating system programs 48, 50, 52 execute at an exception level EL1 which has less privilege than the hypervisor program 40, but more privilege than the application programs 54, 56, 58, 60, 62, 64 which execute at an exception level EL0.

FIG. 5 is a flow diagram schematically illustrating the operation of the memory management circuitry 18. At step 66 processing waits until a memory access request is received. At step 68 the memory management circuitry 18 determines whether or not there is a hit within the translation lookaside buffer 32 in respect of the virtual address to be translated. If there is a hit, then processing proceeds to step 70 where a determination is made as to whether or not the attributes associated with the virtual address received indicate an attribute fault given the attribute constraints stored within the translation lookaside buffer 32 for the region of memory address space containing the virtual address translated. If there is no attribute fault, then processing proceeds to step 72 where the memory access is performed using the physical address generated by the translation and the attributes associated therewith. Processing thereafter terminates.

If the determination at step 70 is that there is an attribute fault, then processing proceeds to step 74, at which one or both of a virtual machine and/or hypervisor attribute fault are generated and indicate the fault to the appropriate one of the source virtual machine program or the hypervisor program. Thereafter processing is terminated.

If the determination at step 68 is that there is no hit within the translation lookaside buffer 32, then page table walking operations are required. Step 76 uses the virtual address associated with the memory access request received at step 66 as an index into the first stage translation data 22. Step 78 determines whether there is a miss within the first stage page table data. If there is a miss, then step 80 generates a virtual machine translation fault and processing then terminates. If there is not a miss, then appropriate first stage page table data is present and processing proceeds to step 82 where a determination is made as to whether or not there is an attribute failure, i.e. the attributes associated with the memory access request at step 66 do not match the attributes associated with the data recovered by the first stage page table walk, such as the memory access attempting a write to a region which is defined as read only. If there is an attribute failure, then step 84 generates a virtual machine attribute fault returned to the virtual machine program and thereafter processing terminates.

If there is no attribute failure at step 82, then step 86 serves to use the intermediate physical address generated by the first stage page table walk at step 78 as an index into the second stage translation data 24 as part of a second stage page table walk. Step 88 determines whether there is a miss within the second stage page table walk. If there is a miss, then step 90 generates a hypervisor translation fault. Step 92 then determines whether or not the first stage attributes indicate that the region to be accessed is both a virtual machine private region and a device region. If the region to which an access was attempted is both a virtual machine private region and a device region, then processing proceeds to step 94 at which a virtual machine translation fault is generated and returned to the virtual machine program. If the determination at step 92 is that the first stage attributes indicate that the region to which access was attempted is other than both a virtual machine private region and a device region, then step 94 is bypassed. Thereafter processing of the memory access request which resulted in a miss at step 88 is terminated.

If the check at step 88 indicated that there was no miss within the second stage page table walk, then processing proceeds to step 96 at which a determination is made as to whether or not the attribute data returned by the second stage page table walk indicates an attribute failure when compared with the attributes associated with the memory access request received at step 66. If there is an attribute failure, then processing proceeds to step 98, where a hypervisor attribute fault is generated and returned to the hypervisor program. Step 101 then determines if the first stage attributes indicate that the region to which access was attempted is both a virtual machine private region and a device region. If the determination at step 101 is yes, then step 103 serves to generate a virtual machine attribute fault which is returned to the virtual machine. Processing is then terminated. If the determination at step 101 is no, then step 103 is bypassed and processing is terminated.

If there is no attribute failure detected at step 96, then processing proceeds to step 100 at which a determination is made as to whether or not the attributes returned by the first stage page table walk performed at step 76 indicated that the region to be accessed was both a virtual machine private region and a device region. If the region to be accessed is both a virtual machine private region and a device region, then step 102 serves to check that the intermediate physical address generated by the first stage page table walk is identical to the physical address generated by the second stage page table walk, i.e. applies the private-device region management. If the intermediate physical address IPA is identical to the physical address PA, then this indicates that the address translation performed is permitted and processing proceeds to step 104 at which the physical address and attributes associated with the translation are stored within the translation lookaside buffer 32 for subsequent use. Step 72 then performs the memory access using the physical address PA and the attributes concerned.

If the determination at step 100 is that the first stage attributes indicate other than the region is both a virtual machine private region and the device region, then step 102 is bypassed (corresponding to non-private-device region management) and processing proceeds directly from step 100 to step 104.

If the determination at step 102 is that the intermediate physical address IPA does not match the physical address PA (e.g. is not identical), then processing proceeds to step 106 at which a virtual machine translation fault is generated and returned to the virtual machine program (and optionally a hypervisor translation fault is generated and returned to the hypervisor program). Thereafter processing is terminated.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data comprising:
processing circuitry to execute a hypervisor program to provide a virtual machine execution environment and to execute a virtual machine program using said virtual machine execution environment; and
memory management circuitry to manage a translation of a virtual address generated by said virtual machine program to a physical address of a memory using first stage translation data specifying a translation from said virtual address to an intermediate physical address and second stage translation data specifying a translation from said intermediate physical address to said physical address; wherein
said memory management circuitry controls access to said memory to provide one or more virtual-machine private regions within said memory that are accessible to said virtual machine program and are at least marked as inaccessible to said hypervisor program;
said first stage translation data includes attribute data to mark respective regions of said memory as one of one or more device regions or as one of one or more non-device regions; and
when a memory access request by said virtual machine program is to a target region of said memory that is both a virtual machine private region and a device region, said memory management circuitry modifies management of said translation performed in dependence upon said second stage translation data to provide private-device region management.

2. Apparatus as claimed in claim 1, wherein said private-device region management comprises determining whether said second stage translation data translates said intermediate physical address of said memory access to a physical address of said memory access matched with said intermediate physical address.

3. Apparatus as claimed in claim 2, wherein said physical address is matched with said intermediate physical address when said physical address and said intermediate physical address are identical.

4. Apparatus as claimed in claim 2, wherein when said intermediate physical address of said memory access to a physical address of said memory access unmatched with said intermediate physical address, said memory management unit returns a fault indication to said virtual machine program.

5. Apparatus as claimed in claim 4, wherein said fault indication is a translation fault indication.

6. Apparatus as claimed in claim 4, wherein when said intermediate physical address of said memory access to a physical address of said memory access is unmatched with said intermediate physical address, said memory management unit returns a fault indication to said hypervisor program.

7. Apparatus as claimed in claim 1, wherein said private-device region management comprises responding to an absence of translation data to translate said intermediate physical address to said physical address within said second stage translation data to send a fault indication to said hypervisor program and a fault indication to said virtual machine program.

8. Apparatus as claimed in claim 7, wherein said fault indication sent to said hypervisor program triggers switching from executing said virtual machine program to exception handling by said hypervisor program and said fault indication sent to said virtual machine program triggers exception handling by said virtual machine program when said hypervisor program restarts execution of said virtual machine program.

9. Apparatus as claimed in claim 1, when said target region of said memory that is both other than a virtual-machine private region and other than a device region, said translation performed in dependence upon said second stage translation data provides region management different from said private-device region management.

10. Apparatus as claimed in claim 9, wherein said non-private-device management comprises permitting said memory management circuitry to use said second stage translation data to translate said intermediate physical address to a physical address different from said intermediate physical address.

11. Apparatus as claimed in claim 9, wherein said non-private-device management comprises responding to an absence of translation data to translate said intermediate physical address to said physical address within said second stage translation data by sending a fault indication to said hypervisor program without sending a fault indication to said virtual machine program.

12. Apparatus as claimed in claim 1, wherein a memory mapped hardware device is mapped by said first stage translation data to said device region.

13. Apparatus as claimed in claim 12, wherein said memory mapped device is one of:
an input/output memory mapped device;
a real time clock device;
a random number generator; and
a system security status register.

14. Apparatus as claimed in claim 1, wherein general purpose memory is mapped by said first stage translation data to said non-device region.

15. Apparatus as claimed in claim 1, wherein said first stage translation data is stored within said private region.

16. Apparatus as claimed in claim 1, wherein said first stage translation data includes attribute data permitting marking of said one or more regions of said memory as one of said one or more virtual-machine private regions.

17. Apparatus as claimed in claim 1, wherein said second stage translation data is stored within a region of said memory inaccessible to said virtual machine program.

18. Apparatus as claimed in claim 1, wherein said processing circuitry executes one or more further virtual machine programs each having respective independent first stage translation data.

19. Apparatus as claimed in claim 18, wherein said one or more virtual-machine private regions are inaccessible to any of said one or more further virtual machine programs.

20. Apparatus for processing data comprising:
processing means for executing a hypervisor program to provide a virtual machine execution environment and for executing a virtual machine program using said virtual machine execution environment; and
memory management means for managing a translation of a virtual address generated by said virtual machine program to a physical address of a memory using first stage translation data specifying a translation from said virtual address to an intermediate physical address and second stage translation data specifying a translation from said intermediate physical address to said physical address; wherein
said memory management means controls access to said memory to provide one or more virtual-machine private regions within said memory that are accessible to said virtual machine program and are at least marked as inaccessible to said hypervisor program;
said first stage translation data includes attribute data to mark respective regions of said memory as one of one or more device regions or as one of one or more non-device regions; and
when a memory access request by said virtual machine program is to a target region of said memory that is both a virtual machine private region and a device region, said memory management means modifies management of said translation performed in dependence upon said second stage translation data to provide private-device region management.

21. A method of processing data comprising:
executing a hypervisor program to provide a virtual machine execution environment;
executing a virtual machine program using said virtual machine execution environment;
managing a translation of a virtual address generated by said virtual machine program to a physical address of a memory using first stage translation data specifying a translation from said virtual address to an intermediate physical address and second stage translation data specifying a translation from said intermediate physical address to said physical address; and
controlling access to said memory to provide one or more virtual-machine private regions within said memory that are accessible to said virtual machine program and are at least marked as inaccessible to said hypervisor program; wherein
said first stage translation data includes attribute data to mark respective regions of said memory as one of one or more device regions or as one of one or more non-device regions; and
when a memory access request by said virtual machine program is to a target region of said memory that is both a virtual machine private region and a device region, modifying management of said translation performed in dependence upon said second stage translation data to provide private-device region management.

* * * * *